S. SHIMODA.
FRUIT PITTING TOOL.
APPLICATION FILED NOV. 22, 1915.
1,178,684.
Patented Apr. 11, 1916.
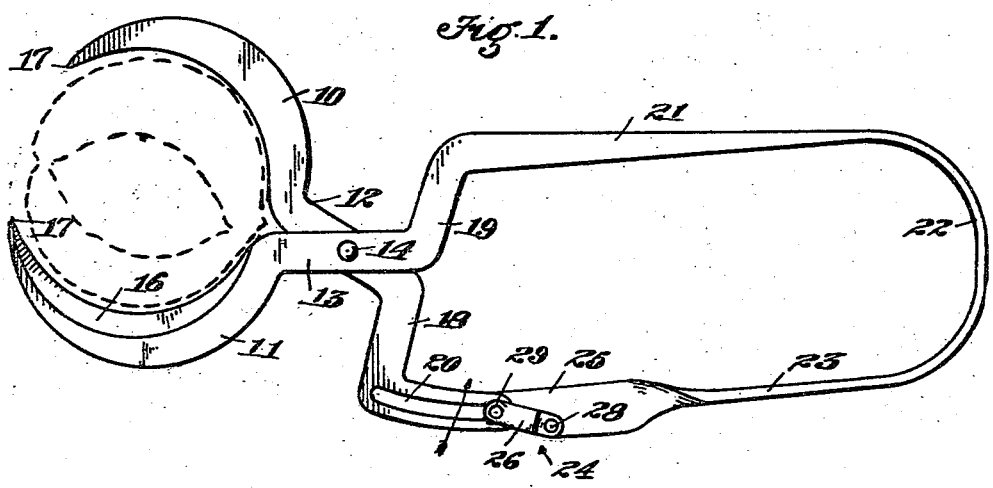
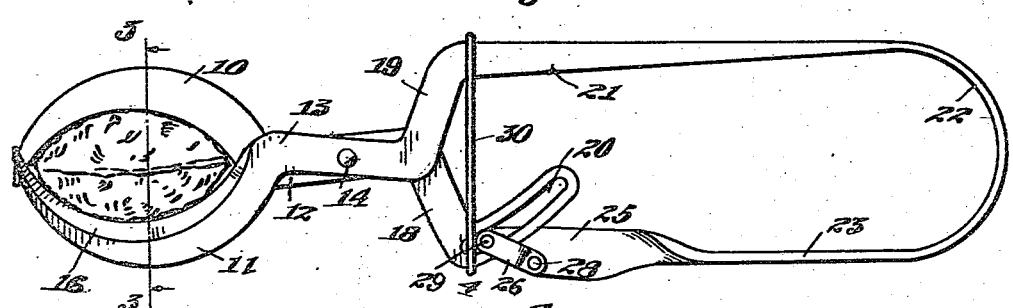
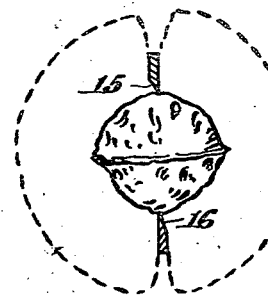
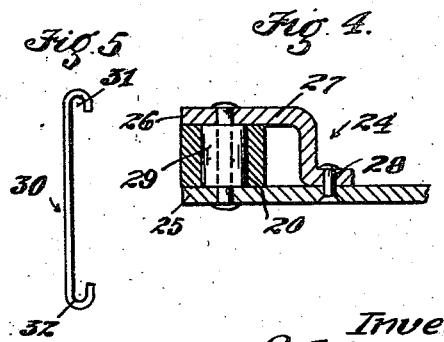
Inventor:
Sektaro Shimoda
by Hazard Berry and Miller
attys.

UNITED STATES PATENT OFFICE.

SEKTARO SHIMODA, OF NORDHOFF, CALIFORNIA.

FRUIT-PITTING TOOL.

1,178,684.  Specification of Letters Patent.  Patented Apr. 11, 1916.

Application filed November 22, 1915. Serial No. 62,849.

*To all whom it may concern:*

Be it known that I, SEKTARO SHIMODA, a subject of the Emperor of Japan, residing at Nordhoff, in the county of Ventura and State of California, have invented new and useful Improvements in Fruit-Pitting Tools, of which the following is a specification.

This invention relates to a tool and particularly pertains to a device for pitting fruit.

It is the object of this invention to provide a fruit pitting tool which is adapted for use in removing the pits from fruits such as peaches, plums, apricots, and the like, and which serves the double purpose of removing the pit and severing the fruit in halves.

Another object is to provide a fruit pitting tool embodying a pair of relatively movable cutting jaws with a novel means for actuating the jaws.

Another object is to provide a hand operated means for actuating a pair of pivotally connected jaws adapted to be grasped in the hand and on application of pressure to close the jaws without sliding friction between the hand of the operator and the hand-hold, thus rendering the operator less liable to fatigue and discomfort.

A further object is to provide simple means for normally retaining the jaws of the tool in open relation to each other and which, on removing pressure on the hand-hold, will automatically separate the jaws and release the pit engaged thereby.

Other objects will appear hereinafter.

The invention is illustrated in the accompanying drawings in which:

Figure 1 is a view in side elevation of the device, showing it in its normal opened position and illustrating the manner of engaging the fruit in the pitting operation. Fig. 2 is a side elevation showing the device in its closed position with a fruit pit grasped between the jaws. Fig. 3 is a view in transverse section on the line 3—3 of Fig. 2, showing the manner in which the fruit is bisected and the pit engaged by the cutting jaws. Fig. 4 is an enlarged detail section on the line 4—4 of Fig. 1 showing the slot and roller construction. Fig. 5 is a detail in perspective of the jaw locking device for retaining the jaws in their closed position when the tool is not in use.

More specifically, 10 and 11 indicate arcuate cutting jaw or blade members which are formed with shank portions 12 and 13 respectively; the shanks 12 and 13 being connected together by a pivot pin 14 by which the jaws 10 and 11 are pivotally mounted in relation to each other. The adjacent faces of the jaws and shanks are flat and alined so that the jaws may slidably contact each other shear fashion. The outer faces of the jaws are beveled on their inner arcuate edges, as indicated at 15 and 16, as shown in Fig. 3, to form cutting edges. The outer ends of the jaws converge to points, as indicated at 17, so that the tips of the jaws may readily penetrate the body of fruit to be acted on thereby in event the fruit is of a diameter too large to permit it being completely spanned by the jaws when in their open position.

The shanks 12 and 13 extend approximately equi-distant on opposite sides of the pivot pin 14 and their outer ends are bent in opposite directions to form spacing members 18 and 19. The member 18 is formed with a transverse arcuate slot 20 arranged eccentric to the pivot pin 14 and extending in the general direction of the shank 12 and jaw 10. The member 19 is bent at its outer end to form a hand-hold 21 which terminates at its outer end in an arcuate resilient member 22. The resilient member 22 is preferably formed of spring metal in continuation of the hand-hold 21 and is returned on itself. The outer end of the member 22 terminates in a second hand-hold member 23 extending substantially parallel with the hand-hold member 21 and in continuation thereof. The hand-hold members 21 and 23 are thus resiliently connected together by the spring portion 22 and adapted to be advanced and retracted in relation to each other. The spring portion 22 is tensioned to exert an outward pressure on the hand-hold member 23 tending to separate the latter in relation to the hand-hold member 21.

Formed on the outer end of the hand-hold member 23 is a yoke 24, one member 25 of which is formed by a continuation of the hand-hold 23 and the other member 26 of which is formed by an angular bracket 27 rigidly secured to the hand-hold 23 by a rivet 28 or other suitable fastening. The members 25 and 26 of the yoke 24 extend astride of the outer end portion of the member 18 and carried by the members 25 and 26 is a roller 29 which is disposed in the arcuate slot 20 to form a slidable connection between the outer end of the hand-hold 23 and the member 18 with its connected shank and jaw.

The outward pressure of the spring member 22 exerts a yieldable pressure on the outer wall of the slot 20 and normally acts to maintain the jaw member 10 in its open position, as shown in Fig. 1. The roller 29 will then be disposed adjacent the outer end of the slot 20.

In the operation of the invention the fruit to be pitted is placed between the open jaw members 10 and 11, as indicated in Fig. 1. The hand-holds 21 and 23 are then grasped and pressed toward each other; the spring portion 22 permitting the hand-hold 23 to advance at its outer end toward the hand-hold 21. This inward movement of the outer end of the hand-hold 23 exerts an inward pull on the member 18 in the direction indicated by the arrow in Fig. 1, which causes the jaw member 10 to advance toward the jaw member 11; continued inward movement of the hand-hold 23 causing the roller 29 to advance along the slot 20 toward its inner end and thereby moving the jaw member 10 into engagement with the pit of the fruit, as shown in Fig. 2. When this is effected the fruit will be severed in halves and the divided portions may be readily separated from the pit, which will remain in its engaged position between the jaws 10 and 11. On releasing the pressure on the hand-hold members 21 and 23 the spring member 22 will restore the hand-hold 23 to its normal position, as shown in Fig. 1, thereby releasing the fruit pit.

In the foregoing operation, sliding movement of the hand on the hand-hold members is slight and a comparatively short inward movement of the hand-hold member 23 in relation to the hand-hold member 21 will effect the closing operation of the jaw members. This facilitates the operation of the tool by the workman and reduces the fatigue and discomfort incident thereto to a minimum.

When the tool is not in use it is desirable to lock the jaw members in their closed position. This is accomplished by means of a locking device 30, particularly shown in Fig. 5, which consists of a bar bent inwardly at its ends to form hook members 31 and 32 which may be placed astride of the hand-hold 21 and the member 18 when in their innermost position, as illustrated in Fig. 2, thus holding the jaws in their closed position in opposition to the spring member 22.

While the invention is described as applied to a fruit pitting tool, it is manifest that it is adapted for use in any type of tool embodying a pair of pivotally connected relatively movable jaws or blades, and it is obvious that the details of construction here shown and described may be varied as occasion may require without departing from the spirit and scope of the invention as set forth in the appended claims.

What I claim is:

1. A fruit pitting tool, comprising a pair of pivotally connected jaw members, a hand-hold rigidly attached to one of said jaw members, an arcuate spring member affixed to the outer end of said hand-hold, a second hand-hold extending substantially parallel with the first-named hand-hold connected at one end to said spring member, a projection on the other jaw member formed with an arcuate slot, and a member on said second hand-hold slidably engaging said slot.

2. A fruit pitting tool comprising a pair of arcuate cutting jaws, shanks on said jaws pivotally connected together, an extension to one of said shanks formed with an arcuate slot, a hand-hold rigidly connected to the other shank, an arcuate spring member formed in continuation of said hand-hold, a second hand-hold extending approximately parallel with the first-named hand-hold and formed in continuation of said spring member, and a roller on said second hand-hold slidably engaging the arcuate slot.

3. In a fruit pitting tool, the combination of a pair of blade members adapted to encompass the pit, said members being pivotally mounted in relation to each other, a resilient handle portion secured to one of the blades, a bracket mounted at the terminating end of said resilient portion, a roller adapted to rotate between said bracket and the resilient portion, a member formed with an arcuate slot adapted to receive and allow movement of the roller therein, said arcuate member being secured to the other blade of the device.

4. In a tool, the combination of a pair of members pivotally mounted in relation to each other, a resilient portion secured to one of the pivoted members, an arcuate slotted member secured to the other pivoted member, and means mounted upon the terminating end of the resilient portion for movably engaging the slot within the arcuate slotted member, whereby the pivotally mounted members will be moved in relation to each other as the engaging portion of the terminating end of the resilient member is caused to move along the slot within the arcuate slotted member.

In testimony whereof I have signed my name to this specification.

SEKTARO SHIMODA.